Dec. 22, 1959 R. P. EVANS 2,918,617
VOLTAGE REGULATOR FOR GENERATORS
Filed Aug. 8, 1956
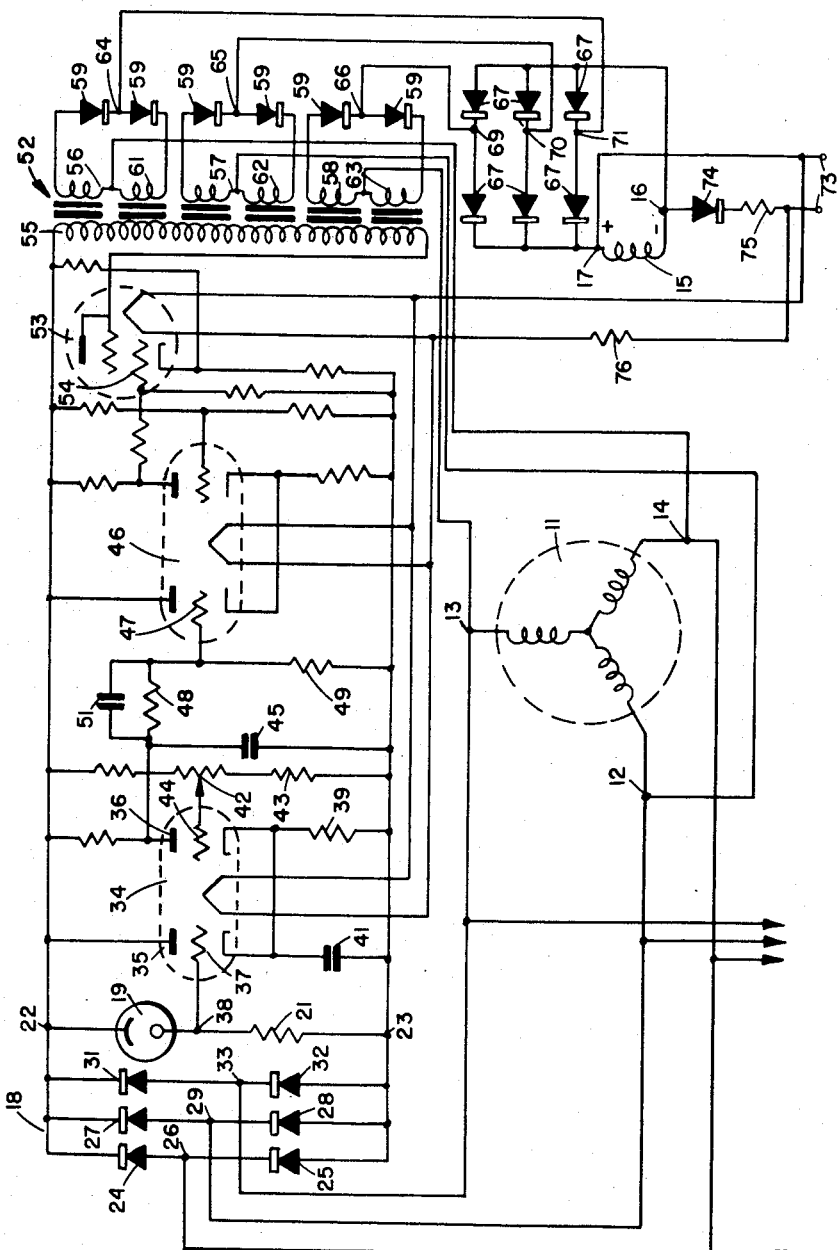
INVENTOR.
ROBERT P. EVANS
BY Harold J. Downs
ATTORNEY

United States Patent Office 2,918,617
Patented Dec. 22, 1959

2,918,617

VOLTAGE REGULATOR FOR GENERATORS

Robert P. Evans, Bell, Calif., assignor to North American Aviation, Inc.

Application August 8, 1956, Serial No. 602,790

6 Claims. (Cl. 322—28)

This invention relates to voltage regulation and concerns particularly regulation of voltage in polyphase alternating-current circuits.

When magnetic amplifiers are employed for controlling inductive circuits there has been a tendency for irregularities in the regulation curve, hunting and instability to result. This problem has been especially aggravated in alternating-current circuits supplied by a generator where control is accomplished by controlling the flow of current in a generator field winding because a field winding is a highly inductive circuit.

It is therefore an object generally of this invention to overcome these problems.

An object of the invention is to obtain close regulation with relatively light, compact equipment and with minor requirements for external direct-current power supply.

A further object is to obtain smooth control with large fluctuations in load, especially in case of inductive loads, and to avoid instability at any point of the control characteristics.

Still another object is to accomplish improved smooth voltage control of alternating-current generators employing field control.

Other and further objects, features and advantages of the invention will become apparent as the description proceeds.

In carrying out the invention in accordance with a preferred form thereof, rectifiers are employed in conjunction with a vacuum tube type direct-current preamplifier and an alternating-current magnetic amplifier for adjusting field voltage in response to any deviations of polyphase output voltage from a predetermined value. The input circuit of the preamplifier is coupled to the generator output terminals through sensing rectifiers and a direct-current reference source is utilized in the coupling for enabling the preamplifier to produce an output responsive to any deviation from the desired output voltage.

A better understanding of the invention will be afforded by the following description considered in conjunction with the accompanying drawing in which the sole figure constitutes a circuit diagram of an embodiment of the invention.

In the illustrated embodiment, there is a three-phase generator 11 having three terminals 12, 13 and 14, constituting polyphase output terminals and having a field winding 15 with field terminals 16 and 17.

For detecting deviations from a desired value of the output voltage of the armature windings of the machine 11 appearing at the output terminals 12, 13 and 14, sensing rectifiers 18 are provided in conjunction with a direct-current voltage standard or reference voltage source taking the form in the illustrated embodiment of a voltage regulator gas tube 19 connected in series with a resistor 21 to output, junction or neutral terminals 22 and 23 of the sensing rectifiers 18. The sensing rectifiers 18 are connected in a three-phase bridge for a three-phase system and comprise three pairs of diode elements, namely, a pair of diodes 24 and 25 connected in series in the same polarity relation to the terminals 22 and 23 and having a junction terminal 26 connected to one of the polyphase terminals 14. Similarly, the diodes 27 and 28 have a junction terminal 29 connected to the polyphase terminal 12, and the diodes 31 and 32 have a junction terminal 33 connected to the polyphase terminal 13.

The arrangement is such that so long as the voltage at the polyphase terminals 12, 13 and 14 and therefore the unidirectional voltage between the terminals 22 and 23 remains at a predetermined value for which the apparatus is adjusted, the voltage drop across the resistor 21 is a constant value and no effect is produced. A direct-current amplifier 34 is provided for amplifying any deviations from the desired three-phase output voltage resulting in voltage drop across resistor 21. The direct-current amplifier 34 is a two-stage cathode coupled amplifier comprising a pair of triode elements 35 and 36. The triode 35 has a control grid 37 connected to the junction terminal 38 of the voltage regulator gas tube 19 and the resistor 21. The cathode resistor 39 is by-passed by a condenser 41. Adjustment of amplification is obtained by setting of a tap 42 on a voltage divider resistor 43. The tap 42 is connected to a control grid 44 of the second stage triode unit 36.

For further by-passing any current ripples and avoiding the amplification thereof, an additional by-pass condenser 45 is provided which is connected between the terminal 23 and the anode of the triode unit 36.

A second direct-current amplifier 46 is provided, which is also cathode coupled, having an input control grid 47 coupled to the anode of the triode unit 36 through a stability-providing lead network comprising resistors 48 and 49 with a condenser 51 shunting the resistor 48. A magnetic power amplifier 52 is provided forming a self-saturating circuit which is responsive to the output of the direct current amplifier 46 through a current-controlling vacuum tube 53 which may be referred to as a rheostat tube or thermionic rheostat.

The rheostat tube 53 has a control grid 54 coupled to the anode of the second stage tube of the amplifier 46, direct resistance coupling being employed.

The rheostat tube 53 is connected in series with the control winding 55 of the magnetic amplifier 52 to the direct-current terminals 22 and 23.

The magnetic amplifier 52 includes load windings 56, 57, 58, 61, 62 and 63, connected to the polyphase alternating-current output terminals 12, 13 and 14. Series pairs of self-saturating diode rectifiers 59 with junction terminals 64, 65 and 66 are connected in series with parallel pairs of alternating-current magnetic amplifier windings 56, 57, 58, 61, 62 and 63 and the rectifier junction terminals 64, 65 and 66 are in turn connected to junction terminals 69, 70 and 71, of a second set of series pairs of rectifiers 67. The latter are connected as a bridge with the output connected to the field terminals 16 and 17 so that a direct-current voltage appears between the terminals 16 and 17 for supplying the field windings 15. The voltage between terminals 16 and 17 is dependent in magnitude on the current flowing through the magnetic amplifier control winding 55 which in turn is controlled by the rheostat tube 53 responsive to the direct-current amplifiers 34 and 46 through the sensing rectifiers 18. The circuit configuration gives smooth control characteristics even with inductive loads and avoids any points of instability.

All of the direct current required is obtained from the polyphase alternating-current terminals 12, 13 and 14 through the sensing rectifiers 18 and the terminals 22 and 23 except for a minor current required for filament heating and that required upon starting up for initial field excitation. For this purpose, a low voltage direct-current source 73 is provided which may have a voltage of the order of twenty-eight volts, for example, and is connected to the field terminals 16 and 17 through a blocking diode 74 and a resistor 75 and connected to the tube filaments through a dropping resistor 76.

The diode 74 prevents current flow from the source 73 to the field 15 with improper polarity and also prevents the field excitation voltage from charging into source 73 when the field excitation voltage is driven above 28 volts.

Preferably the cores of the reactors constituting the magnetic amplifier 52 are composed of low-loss, relatively high-permeability material such as high-reduction cold-rolled grain oriented 3% silicon steel in toroidal wound strips having thicknesses of the order of approximately six mils.

Upon applications of load to the three-phase generator 11, the terminal voltages drop and consequently the direct-current output voltage of the sensing rectifiers 24, 25, 27, 28, 31 and 32 falls. The preamplifiers convert the reduction in voltage to a decrease of current in the rheostat tube 53 and the control winding 55. Consequent upon the reduction of control current, the output current of the magnetic amplifier 52 increases, causing the field current of the generator 11 to increase and restore the terminal voltages to their original values.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A regulator for a polyphase generator having output terminals and field terminals comprising in combination with such terminals a plurality of rectifiers connected to the said polyphase output terminals and having a first junction terminal and a plurality of rectifiers connected with reverse polarity to said output terminal and having a second junction terminal, the rectifiers thereby forming a polyphase bridge circuit, a voltage regulator tube and a resistor connected in series between the said junction terminals and having a third junction terminal, a thermionic amplifier having current-conducting electrodes connected to the first and second junction terminals and a control electrode coupled to said third junction terminal, a thermionic tube having a control electrode coupled to said amplifier and having current-carrying electrodes, a magnetic amplifier having a control winding connected to the current conducting electrodes of said thermionic tube and having a plurality of load windings each connected to one of said output terminals, a first set of rectifiers connected in series pairs to said load windings, each having a mid terminal, a second set of rectifiers connected in series pairs to the field terminals, each series pair having a mid terminal, each mid terminal of the first set of rectifiers being connected to a different one of the mid terminals of the second set of rectifiers for supplying direct current to the field terminals controlled by the regulator to regulate generator voltage.

2. A regulator for a polyphase generator having output terminals and field terminals comprising in combination with such terminals, reference voltage means connected to the output terminals for energization, means for comparing the potential difference at the output terminals with the reference voltage means output to produce an error voltage, a magnetic amplifier having a control winding responsive to said amplifier and having output windings divided into phases, each of said output phase windings being connected to a separate phase output terminal of said polyphase generator, rectifier means connected to said output windings, the output of said rectifier means being connected to said field terminals for adjusting the potential difference at the field terminals in accordance with variations in error voltage to correct deviations in voltage at said output terminals.

3. A regulator for a polyphase generator having output terminals and field terminals comprising in combination with such terminals, reference voltage means, a rectifier bridge connected to said output terminals to produce a unidirectional voltage response to fluctuations in voltage between the output terminals, means for comparing said unidirectional voltage with said reference voltage means, a thermionic amplifier responsive to the relation between said reference voltage means and the unidirectional voltage, a thermionic tube having current-conducting electrodes and a control electrode, the control electrode being coupled to the thermionic amplifier, a magnetic amplifier having a control winding connected to the current-conducting electrodes of the thermionic tube and having a plurality of windings each connected to one of said generator output terminals, rectifier bridge means connected to said windings, and a connection from the rectifier bridge means to said field terminals for adjusting the voltage between the field terminals in response to said amplifiers for maintaining a predetermined relationship between the reference voltage means and the voltage between the output terminals.

4. A regulator for a generator having output terminals comprising a first rectifier means for connection to generator output terminals, voltage reference means, means for comparing the potential difference between said first rectifier means and said voltage reference means, amplifier means connected to receive the output of said means for comparing, a magnetic amplifier comprising a plurality of load windings divided into phases and at least one control winding, an electronic valve having an anode, cathode and a control element, said anode and cathode being connected in series circuit with said control winding of said magnetic amplifier across the output of said first rectifying means, the control element of said electronic valve being connected to receive the output of said amplifying means comprising rectifier units, each of said units being, a second rectifying means connected to receive the output of a separate one of said load winding phases whereby an output signal is obtained for the control of the field coil of a generator.

5. A regulator for a generator having output terminals comprising a first rectifier means for connection to said generator output terminals, voltage reference means, means for comparing the potential difference between said first rectifier means and said voltage reference means, amplifier means connected to receive the output of said means for comparing, a magnetic amplifier comprising a plurality of load windings divided into phases and at least one control winding, an electronic valve having an anode, cathode and control element, said anode and cathode being connected in series circuit with said control winding of said magnetic amplifier across the output of said first rectifying means, the control element of said electronic valve being connected to receive the output of said amplifying means, a second rectifying means connected to receive the output of said load windings comprising a first pair of diodes for each load winding phase of said magnetic amplifier and a second pair of diodes for each first pair of diodes, each pair of diodes having a junction terminal, each such junction terminal of a first diode pair being connected to a junction terminal of a second diode pair, whereby an output signal is obtained for the control of the field coil of a generator.

6. A rectifier for converting output of an alternating-current generator into direct current comprising a three-phase bridge rectifier, constant voltage dropping means connected across said rectifier in series with a resistor, a first amplifier having an anode and cathode and a control electrode, said anode connected to one side of said rectifier and said cathode connected on the other side of said rectifier, said control electrode being connected intermediate, said constant voltage dropping means and said resistor, a vacuum tube having an anode, a cathode and a control element, a magnetic amplifier having a three-phase output load winding and at least one control winding, the anode of said vacuum tube being connected through said control winding to one side of said bridge rectifier, the cathode of said vacuum tube being connected in circuit with the other side of said bridge rectifier, the control element of said vacuum tube being connected to receive the output of said first amplifier, a first set of three pairs of diodes each connected to a respective load winding of said magnetic amplifier, a second set of three pairs of diodes having their end terminals connected together and the intermediate junction of each pair of diodes connected to an intermediate junction of a respective pair of said first set of diodes, the end terminals of the second set of diodes serving as direct-current output terminals.

References Cited in the file of this patent

UNITED STATES PATENTS

| | | |
|---|---|---|
| 2,472,538 | Krauer et al. | June 7, 1949 |
| 2,525,451 | Graves | Oct. 10, 1950 |
| 2,725,517 | Rogers | Nov. 29, 1955 |
| 2,779,911 | Fischer | Jan. 29, 1957 |
| 2,802,169 | Malick | Aug. 6, 1957 |
| 2,806,990 | Evans | Sept. 17, 1957 |

UNITED STATES PATENT OFFICE

CERTIFICATE OF CORRECTION

Patent No. 2,918,617 December 22, 1959

Robert P. Evans

It is hereby certified that error appears in the printed specification of the above numbered patent requiring correction and that the said Letters Patent should read as corrected below.

Column 4, line 41, after "means" insert a comma; lines 41 and 42, strike out "comprising rectifier units, each of said units being,"; line 42, after "means" and before "connected" insert -- comprising rectifier units, each of said units being --.

Signed and sealed this 21st day of June 1960.

(SEAL)
Attest:

KARL H. AXLINE
Attesting Officer

ROBERT C. WATSON
Commissioner of Patents